W. WESTFALL.
Land Roller.
No. 84,150. Patented Nov. 17, 1868.
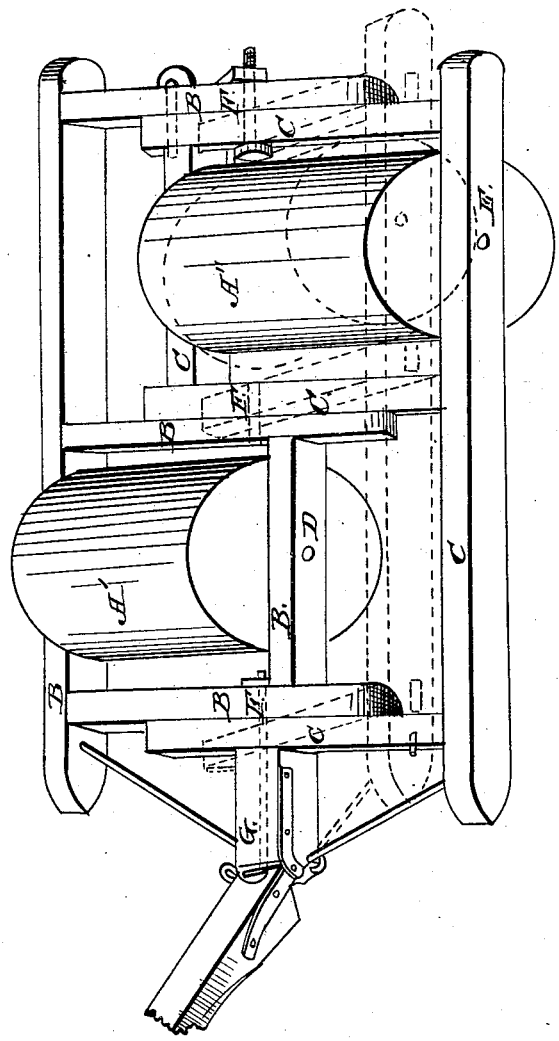
WITNESSES
INVENTOR.

WESLEY WESTFALL, OF CHELSEA, MICHIGAN.

Letters Patent No. 84,150, dated November 17, 1868.

IMPROVEMENT IN FIELD-ROLLER.

The Schedule referred to in these Letters Patent and making part of the same.

*To whom it may concern:*

Be it known that I, WESLEY WESTFALL, of Chelsea, in the county of Washtenaw, and State of Michigan, have invented a new and useful Improvement in Field-Rollers; and I do declare that the following is a true and accurate description thereof, reference being had to the accompanying drawings, and to the letters of reference marked thereon, and being a part of this specification.

This invention relates to that class of implements required by the farmer in preparing the soil for cultivation, and for packing it over the seed when sown, and consists in so arranging the ordinary rollers in common use, in a proper frame, that the rollers will follow and readily adapt themselves to any inequalities in the surface of the ground.

In order to accomplish this end, I use two or more rollers, A' A", the first being secured in the frame B by proper journals and bearings D, while the roller A" is similarly secured in a similar frame C by other proper journals and bearings E.

In the accompanying drawings, each of the timbers forming each of the frames is respectively marked B and C so as to designate which frame they form parts of. These frames are so constructed that they may be hinged together by proper bolts F, (partially shown in dotted lines,) and the rollers so secured in the frames that one precedes the other, while their ends lap upon each other.

G is the necessary device to which to attach a team.

By this arrangement I construct a field-roller that will adjust itself to all inequalities of the ground, and the lapping of the rollers prevents the formation of ridges, and compels the rollers to operate upon the whole surface of the ground.

What I claim as my invention, and desire to secure by Letters Patent, is—

The frames B B B and C C C when constructed as described, and secured by the pins F, to bear the rollers A' A", all arranged, constructed, and operating as described and shown.

WESLEY WESTFALL.

Witnesses:
ISRAEL BAILEY,
DEWITT STEWART.